Nov. 25, 1924.
M. H. CHURCHILL-SHANN
ROAD VEHICLE
Original Filed June 18, 1920   4 Sheets-Sheet 1
1,517,193
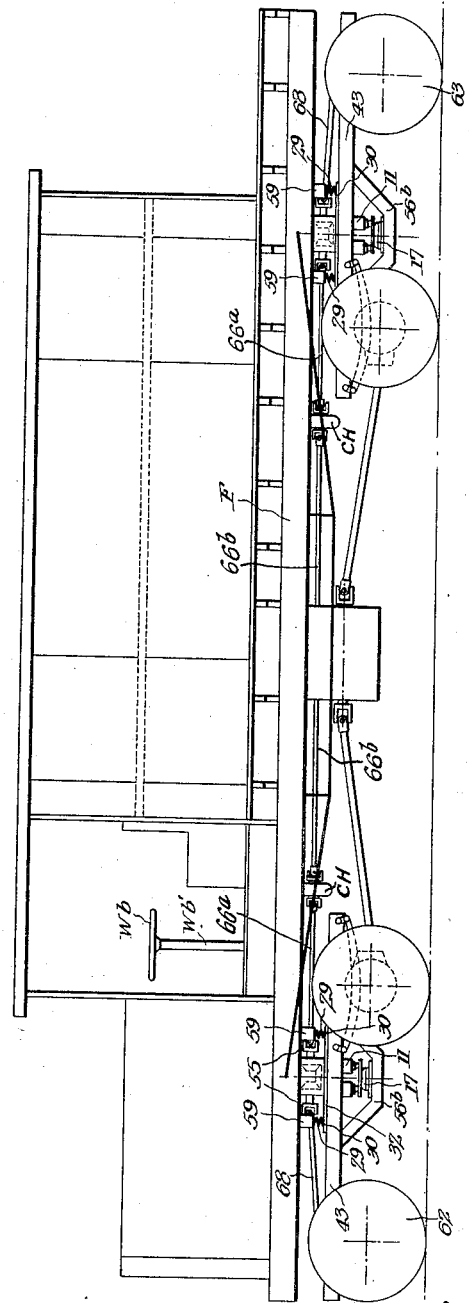
Fig. I.
Inventor
Montague Herbert Churchill-Shann,
By Henry Orth Jr.
Attorney Nov. 25, 1924.
M. H. CHURCHILL-SHANN
ROAD VEHICLE
Original Filed June 18, 1920   4 Sheets-Sheet 2
1,517,193
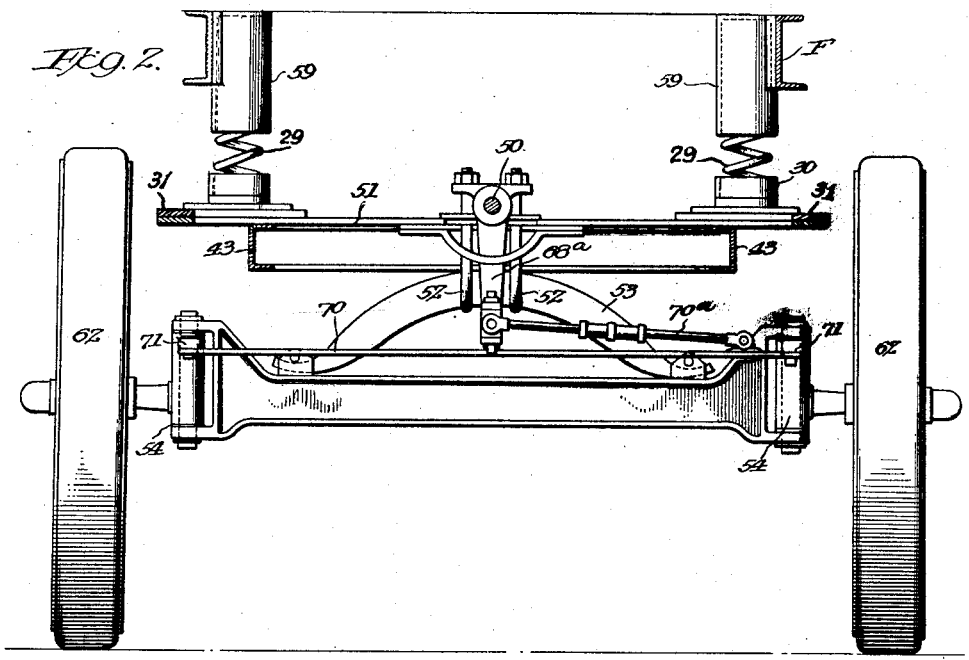
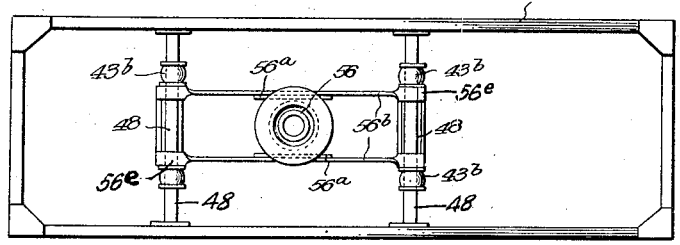
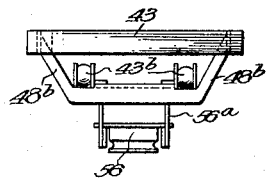
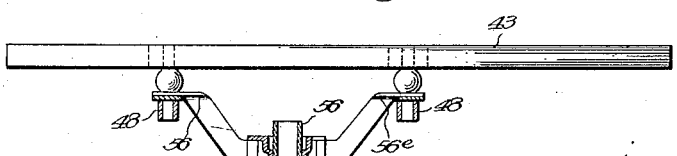
Inventor
Montague Herbert Churchill-Shann,
By
Attorney Nov. 25, 1924.  
M. H. CHURCHILL-SHANN  
1,517,193  
ROAD VEHICLE  
Original Filed June 18, 1920   4 Sheets-Sheet 3
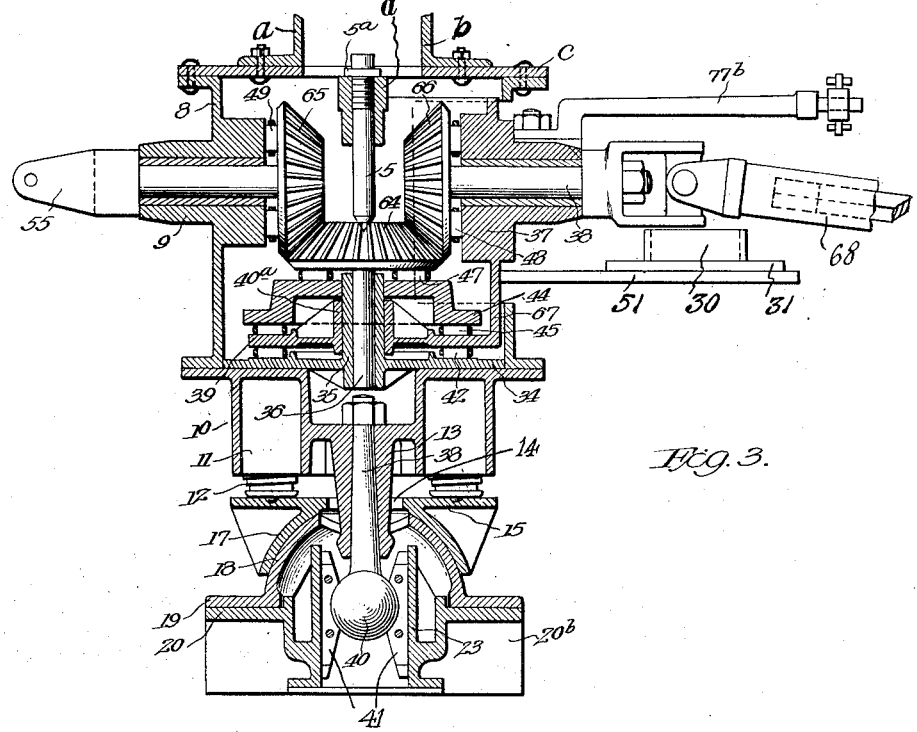
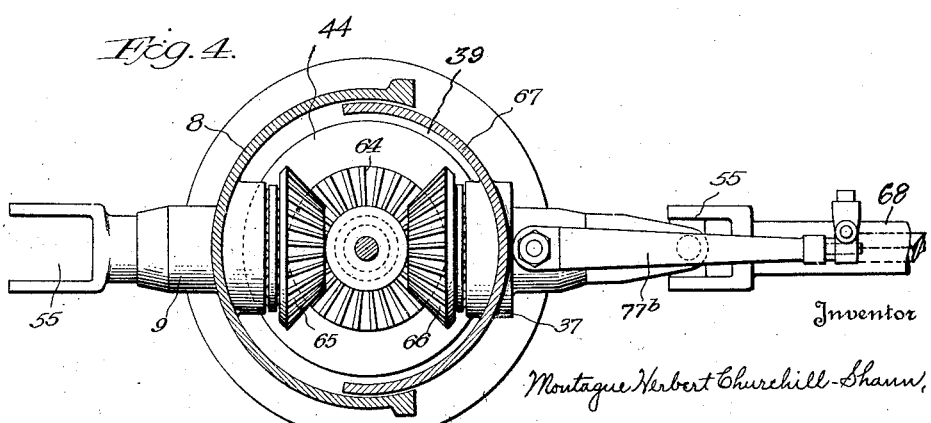

Nov. 25, 1924.　　　　　　　　　　　　　　　　　　　　1,517,193
M. H. CHURCHILL-SHANN
ROAD VEHICLE
Original Filed June 18, 1920　　4 Sheets—Sheet 4
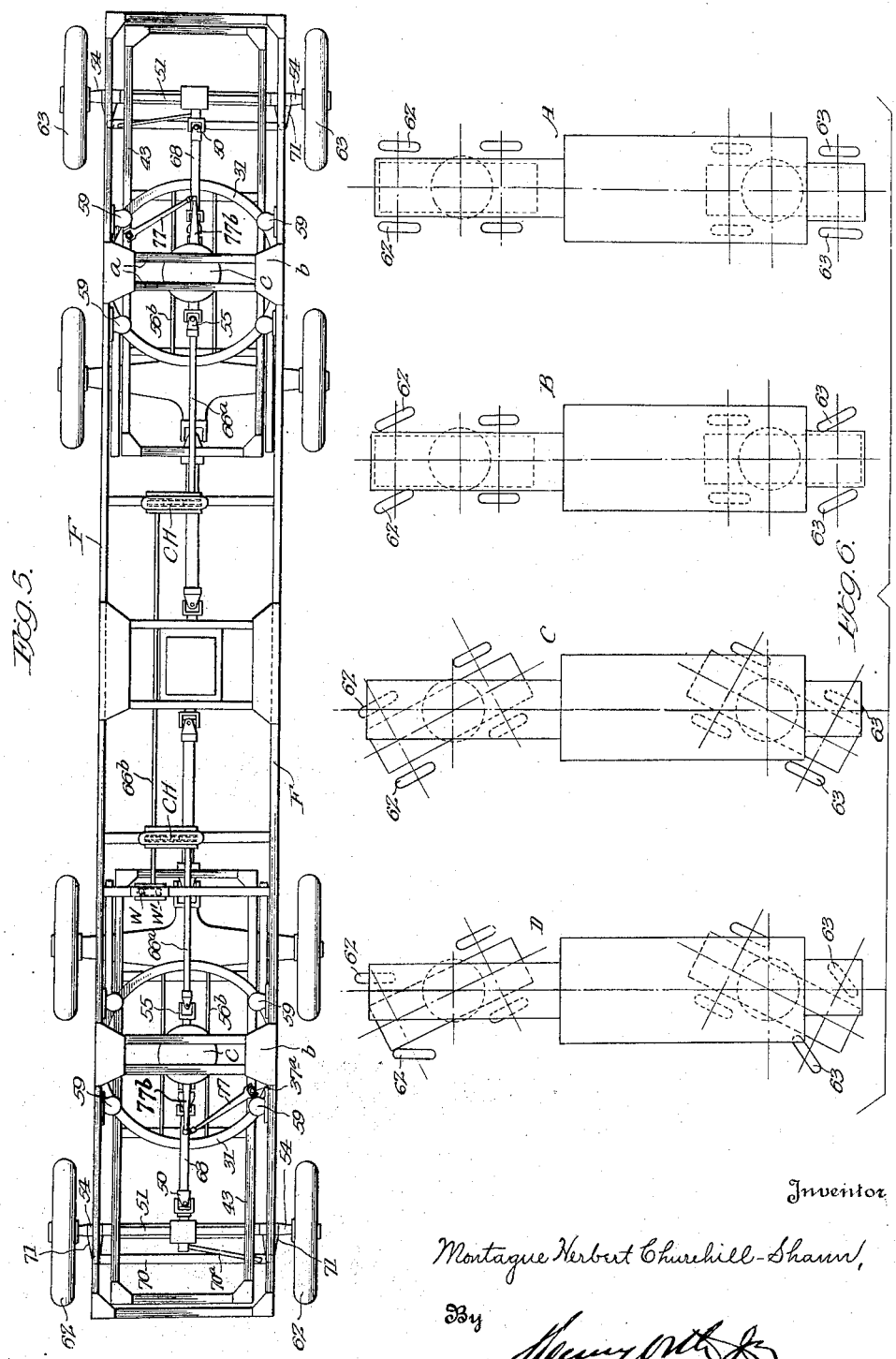
Inventor
Montague Herbert Churchill-Shann,
By
Attorney Patented Nov. 25, 1924.

1,517,193

UNITED STATES PATENT OFFICE.

MONTAGUE HERBERT CHURCHILL-SHANN, OF ALBURY, NEW SOUTH WALES, AUSTRALIA.

ROAD VEHICLE.

Original application filed June 18, 1920, Serial No. 389,795. Divided and this application filed January 22, 1923. Serial No. 614,299.

*To all whom it may concern:*

Be it known that I, MONTAGUE HERBERT CHURCHILL-SHANN, a subject of the King of Great Britain, and a resident of 548 Hanal St., Albury, New South Wales, Australia, have invented certain new and useful Improvements in Road Vehicles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to double bogie road vehicles, and has for its object the construction of such vehicles as will permit steering with but little effort on the part of the driver, whether the bogies have two, three or more pairs of wheels. It is simply necessary that one pair of wheels on the front bogie and one pair on the rear bogie be turned by the driver, after which the whole bogie, which of course is mounted to turn on a vertical axis, will follow and line up with the turned wheels. I also provide a construction which permits of a better distribution of forces and prevents tilting movements of the bogie from being transmitted to the body of the vehicle, as will be hereinafter explained.

My invention also includes the structural parts carried by the bogie to enable steering, and this application is a division of my application Serial Number 389,795, filed June 18, 1920.

Details of construction will be hereinafter particularly pointed out and claimed.

Referring to the drawings, in which like parts are similarly designated—

Figure 1 is a side view of a road vehicle fitted with my steering gear.

Fig. 2 is an end view of the front bogie and shows the front steering on the front wheels.

Fig. 3 is an enlarged view of the steering gear mounted on top of the king pin construction.

Fig. 4 is a plan view of this steering gear.

Fig. 5 is a general plan of the whole main frame bogie frames and the steering gear.

Fig. 6 is a four-fold diagram, A, B, C and D, of the bogies in different relations, and the relations of the wheels to the bogies.

Figs. 7, 8 and 9 show a plan, a side view and an end view of the connections between the frame carrying the bogie pin and the bogie, and hence show the connecting link between the main frame and the bogie frame.

It is, of course, to be understood that the body frame rests on two or more bogies, and that each bogie is pivoted or free to swing with respect to this frame, as is customary with bogie carried vehicles.

The frame F of the vehicle is constructed in any desired manner, and is shown as a frame composed of channel sections.

$a$ designates cross channels connected by gusset plates $b$ to the main channels. The cross channels $a$ support on their under face a flat ring $c$ which may be riveted or bolted to the channels $b$ and to the flange of casting 8. Said casting 8 has a turned inner face and is provided with a rib $d$. The centre pin 5 is screwed into the rib $d$ and has a lock-nut $5^a$. This pin steadies the centre mitre wheel 64.

Casting 8 is secured at its bottom to another casting 10, that supports and carries a king-bolt 38 and is provided with a number of spring sockets 11, here shown as four, in which are mounted heavy helical springs 12.

Casting 10 has a centre portion 13 that extends downward to near a ball 40 on the lower end of the king-bolt 38, and this downward extension passes through a hole 14 in the flat plate of a casting 15. The helical springs 12 bear on plate 15 and carry most of the main weight.

This casting 15 has on its lower side a concave spherical member 17 that seats on a convex spherical member 18 provided with a horizontal flange 19. This flange 19 seats on a casting 20.

Casting 20 has a flange $20^b$ at each side secured to flat bars $56^b$, Figs. 1 and 7. These flat bars $56^b$ have a half twist $56^c$ which fit and are secured to a cross slide 48, and this cross slide is secured in mid position with rubber buffers or springs $43^b$.

The cross slide 48 is carried by bearers $48^b$, $48^b$ which are secured by bolts or rivets to the bogie frame 43. Hence the flange $20^b$ turns with the bogie, while flange 19 does not turn with the bogie, the faces between 19 and 20 being bearing faces on which the weight of the vehicle is transmitted and on which the turning of the bogie is effected.

The plate 20 is cast integral with the side flanges 20$^b$ and a central cylinder 23 in which are mounted to slide bearing blocks 41 in which the ball 40 at the end of the king bolt 38 seats and has universal movement, at the same time permitting vertical action by reason of the slides 41.

The ball 40 is substantially concentric with the spherical members 17 and 18.

The vehicle body frame, Fig. 2, is provided with pockets 59 carrying spiral springs 29 whose lower ends rest in spring seats 30 secured to a ring 31 that rests and turns on a ring 51 mounted on and secured to the bogie frame 43.

The body load is carried by springs 12. The load on 51, due to springs 29, being small except when the bogies tilt.

As the details of a double ring carried by springs are so well known, these details are not shown in an enlarged view.

Within the casting 8 is a plate 34 resting on top of casting 10, and this plate has cast with it a central vertical sleeve 35 in which is mounted the vertical stub shaft 36.

Sleeve 35 has mounted on it a sleeve 40$^a$ cast in one piece with a hemi-cylinder 67. There is a clearance of about one-sixteenth of an inch between the inner cylindrical member 67 and the inner face of the outer cylindrical member 8. The member 67 carries a bearing 37 for the stub shaft of a third mitre gear 66. The casting 67 has a bottom plate 39 concentric with sleeve 40$^a$.

44 is a distance piece to transmit the pressure of the pin 5 through mitre gear 64 onto plate 34. Roller bearings 42 take up this thrust on plate 34, and roller bearings 45 take up this thrust between plate 39 and distance piece 44.

47 is a roller bearing that takes up the thrust from mitre gear 64 to distance piece 44, and roller bearings 48 and 49 take up the end thrust of mitre gears 65 and 66.

Full details of these roller bearings on an enlarged view are not shown, as roller thrusts are very well known.

A telescoping Cardan shaft 68 is connected to the stub shaft 38 of mitre gear 66. The knuckle 50 at the other end of this shaft is pivotally mounted on a cross member 51 of the bogie frame 43.

Suitable yokes 52 secure this knuckle on top of cross member 51 of the bogie frame 43 and at the same time hold the transverse frame spring 53 of the bogie.

68$^a$ is a lever worked off the knuckle joint 50, at the outer end of which lever is mounted a rod 70$^a$ whose other end is connected in the usual manner to the short lever 71 of the steering knuckles 54 on which the front steering wheels are mounted; a rod 70 connects the two front steering knuckles in the usual manner to cause both front wheels 62 to move together.

The rear wheels 63 are similarly connected.

37$^a$, Fig. 5, is a bearing secured on the bogie frame 43 and this bearing has a universal joint to rod 77. The other end of rod 77 has a universal joint secured to lever 77$^b$, and lever 77$^b$ is rigidly secured to the bearing 37 of mitre wheel 66.

The turning of the bogie frame carries round the bearing 37, cylindrical member 67, sleeve 40$^a$ and plate 39, all of these are in one piece, and any turn of the bogie causes mitre gear 66 to revolve on mitre gear 64, sun and planet movement.

The stub shaft of the mitre gear 65 is connected by a knuckle 55 to a steering shaft 66$^a$, and this is the same for both bogies.

66$^a$ is connected to a chain gear, C H, to transmit rotation to a lay shaft 66$^b$ and thence to a shaft 66$^a$ at the other end. Lay shaft 66$^b$ is provided with a worm wheel $W^1$ operated by worm W, Fig. 5, operated by the hand wheel $W^b$. The shaft of wheel $W^b$ is $W^{b1}$ and is the same shaft that W is secured to. Hence the turning of hand wheel $W^b$ operates by W the worm and turns $W^1$, this turns lay shaft 66$^b$ and this operates the chain gears C H at both ends.

By reason of the mitre gears the two shafts 66$^a$ operating in the same direction turn the two Cardan shafts 68 of the two bogies in a direction opposite to the rotation of the shafts 66$^a$, so that the Cardan shafts 68 on the front and rear bogies will always rotate in the same direction, and the front wheels of the front bogie and the rear wheels of the rear bogie will move in the same angular direction. But to ensure this, rods 70 must be on the same sides of the axles, as shown in Fig. 5.

Assume that the steering wheels 62 of the front bogie, and 63 of the rear bogie, are steered from the straight way position A to the position B in Fig. 6. Then the front of the front bogie turns to the left, as does the rear of the rear bogie.

The front bogie frame 43 turns on its king bolt and automatically follows the set of the wheels 62 tending to make the direction of the bogie frame parallel to the direction in which the wheels are traveling.

Hence the setting of the wheels 62 causes the bogie frame 43 to turn with respect to the body frame F, and as this bogie frame turns on its king-bolt the rod 77, connected to the bogie frame, pulls the arm 77$^b$ and with it the bearing 37 and casting 67 around with it, thus causing mitre gear 66 to roll on the mitre gear 64, which remains stationary on its bearing. Mitre gear 64 is held by companion mitre gear 65, and 65 is locked by the worm gear W and $W^1$.

Hence this planetary movement causes

Cardan shaft 68 to be rotated reversely and return the steering wheels 62 back to the normal position parallel to the bogie frame, so that as the bogie turns through a given angle toward parallelism with the wheels, the wheels are simultaneously turned reversely, as above described, back toward parallelism with the bogie frame.

This is shown in position C, Fig. 6.

These movements are simultaneous and equal, so that when the steering wheels are set at a given angle the bogie frame will assume a final position at about half the angle that the wheels were set. Thus, a definite rotation of the hand wheel W$^b$ causes a definite turn of both bogies, as the steering wheels 62 and 63 are reversely set by the revolution of the mitre gear 66 causing a rotation of its axis in an opposite direction to that in which it had been initially turned.

It will thus be seen that the front bogie swings toward the set given to its front wheels, while the rear bogie with its rear wheels are set to the same angle as the front wheels and swings through the same angle but in a reverse direction, and the rear wheels 63 are simultaneously brought back to parallelism with the bogie frame 43 in the same manner as the front wheels of the front bogie.

These two bogies thus assume the position shown at C, Fig. 6.

In order to position the steering wheels for straight way travel, the steering wheels are set in a reverse position to B, as shown at D, Fig. 6.

This turns the bogie back into the position to become parallel with the main frame F, and the automatic gear ensures that on the bogies again coming into line with the main frame, the steering wheels 62 and 63 are also in line, that is a return to position A, Fig. 6.

Without this automatic action bogie steering would be impossible, as the vehicle would not run straight.

The driving power for the vehicle is applied to the rear wheels of the front bogie and to the front wheels of the rear bogie, as described in my aforesaid application.

It will be noted that the body frame F is supported by spiral springs 29 in addition to springs 12. Springs 12 are between parts rigidly connected to the body frame F and parts carried by the bogies.

Since the main weight is borne by springs 12 and the spherical seat 17 prevents the tilt of the bogie from altering the compression of springs 12, the tilt of the bogie can only affect the main frame through the spiral springs 29 which have a much longer range.

This enables the bogie frame 43 to tilt in any direction by reason of road inequalities without much transference of these tilting movements to the body frame.

The king-pin has universal movement about the ball 40, so that the tilt of the bogie will not affect the tractive load, and the vertical slide 23 is to prevent the dead-weight load from affecting the tractive load.

For maximum effect the centre of bogie pin ball 40 is normally in line with the driving axle.

The spherical members 17 and 18 are substantially concentric with the ball 40, and they transmit the dead-weight load but not the tractive load.

The power and the dead weight load being rectangular do not influence one another, as no vertical load can be transmitted to the king-pin head 40, as it is free to move vertically, and no tractive or horizontal force can be transmitted to the main springs 12 or to the tilting springs 29. Without this the variation of tractive force would cause wear on the tires and mechanism, as well as require more average power.

The action of the cross slide 48 is to prevent the turning of the bogie from giving a side thrust to the driving wheels. The driving wheels are the pivot on which the bogie turns relative to the road, while the bogie pin is the pivot on which the bogie turns relative to the main frame.

This is not new, it is borrowed from railway practice.

The cross slide is only in operation during the transition from position B to position C, Fig. 6, or the transition from D to A. While in position A or position C, that is, running on the straight or running on a curve, the spring buffers 43$^b$, which may be of rubber, always bring the bogie frame central.

This is railway practice, it is to ensure that the differential of curvature may be negotiated without shock; being an old combination it is no part of the invention per se, but is an important part of the vehicle.

I claim—

1. In a bogie vehicle, means to turn the steering wheels of the bogie and means operated by the bogie frame as it slews under the direction of the wheels to reversely turn said wheels to parallel position with the bogie frame.

2. In bogie vehicles, a manually operated steering shaft, a differential mitre gear mechanism actuated by said shaft, a Cardan shaft operated by said mechanism, steering wheels turned by said shaft, and means connected to the bogie to actuate said mechanism to automatically reverse the direction of rotation of the Cardan shaft and thereby bring the steering wheels and the bogie parallel.

3. In a bogie vehicle, a bogie-supported body frame, a differential mitre gear mechanism secured to said body frame and capable of bodily rotating with respect to the bogie, a manually-operated steering shaft operating a mitre gear of said mechanism, a Cardan shaft rotated by another mitre gear of said mechanism, steering road wheels turned from said shaft, means connecting the bogie and the latter mitre gear to automatically impart planetary movement thereto to reversely rotate said Cardan shaft and thereby reversely turn said steering wheels to bring said wheels and bogie parallel.

4. In a bogie vehicle, a bogie-supported body frame, a differential mitre gear mechanism secured to said frame and capable of bodily rotating with respect to the bogie, a manually-operated steering shaft operating a mitre gear of said mechanism, a Cardan shaft rotated by another mitre gear of said mechanism, means to steer a pair of wheels of the bogie by said shaft, means between the bogie and said latter gear to automatically impart planetary movement thereto to reversely rotate said Cardan shaft, and a king-pin carried by said mechanism, a cylinder on the bogie, vertically slidable bearing blocks therein, said king-pin mounted in and having universal movement in said blocks.

5. The combination with a body frame of a pair of bogies supporting said frame, a differential mitre gear mechanism on each bogie, a manually operated steering gear connecting said mechanism for simultaneous movements, means connecting a mitre gear of said mechanism with its respective bogie, Cardan shafts connected to said gears and means to connect each Cardan shaft to a pair of wheels of its respective bogie for steering.

6. In a bogie vehicle, the combination with the body frame of the vehicle and a bogie having at least two axles; of bogie body springs between the bogie and the vehicle, a king pin mounted between the axles, differential mitre gear steering mechanism above said pin and concentric therewith, means on the bogie to receive said pin and having vertical movement, and springs between the bogie steering mechanism and king pin supporting means whereby the bogie may tilt in any direction without transmitting much of said tilting movement to the body.

7. The combination with a vehicle body frame, of a pair of bogies supporting said frame, bogie body springs between the bogie and the vehicle, a differential mitre gear mechanism on each bogie between a pair of axles thereof, a manually-operated steering shaft connecting said mechanisms for simultaneous movements, means connecting a mitre gear of said mechanisms with its respective bogie, Cardan shafts connected to said gears and to a pair of steering wheels of the respective bogies, a vehicle king-pin for each bogie carried by the body frame below the respective differential mechanism, means on each bogie to receive its pin and having vertical movement, and springs between the bogie and frame whereby the bogie may tilt in any direction without tilting said mechanism.

8. In a bogie vehicle, a differential steering gear mechanism, means to connect one of the gear wheels of said mechanism to the steering wheels of the bogie to set them upon rotary movement of said gear wheel, and means to connect the bogie frame and said bogie to cause said bogie to impart a revolving or planetary movement to said gear wheel.

9. In a bogie vehicle a differential steering gear mechanism comprising three meshing mitre gears, manual means to operate and set one of said gears for steering, means to set the bogie steering wheels by the rotary movement of the third mitre gear, and means between said third mitre gear and the bogie frame to impart revolving movement to said gear by the bogie as it moves under the influence of its steering wheels.

In testimony that I claim the foregoing as my invention, I have signed by name hereto.

MONTAGUE HERBERT CHURCHILL-SHANN.